(12) United States Patent
Chang et al.

(10) Patent No.: US 7,617,020 B2
(45) Date of Patent: Nov. 10, 2009

(54) METHOD FOR CONTROLLING SYSTEM TO WORK AT APPROPRIATE TEMPERATURE

(75) Inventors: Yao-Tsung Chang, Taipei Hsien (TW); Shih-Lin Chiu, Taipei Hsien (TW)

(73) Assignee: Wistron Corp., Hsichih (TW)

( * ) Notice: Subject to any disclaimer, the term of this patent is extended or adjusted under 35 U.S.C. 154(b) by 98 days.

(21) Appl. No.: 11/713,806

(22) Filed: Mar. 5, 2007

(65) Prior Publication Data

US 2008/0009980 A1     Jan. 10, 2008

(30) Foreign Application Priority Data

May 16, 2006    (TW) .............................. 95117341 A (51) Int. Cl.
*G05D 23/00* (2006.01)

(52) U.S. Cl. ...................... 700/300; 700/299; 361/690; 361/695

(58) Field of Classification Search ................. 700/299, 700/300; 361/876, 695, 690
See application file for complete search history.

(56) References Cited

U.S. PATENT DOCUMENTS 5,929,581 A * 7/1999 Van Brocklin et al. ...... 318/471
6,965,175 B2 * 11/2005 Hu et al. ..................... 307/152

* cited by examiner

*Primary Examiner*—Kidest Bahta
*Assistant Examiner*—Nathan Laughlin (57) ABSTRACT

A method for controlling a system to work at an appropriate temperature provides a control manner allowing not only a temperature factor but also a time factor to be considered when a system is heated. When a heated value of the system reaches a certain preset value, a controller will then executes corresponding control modes to emit control signals to allow each of components of the system to obtain a better protection while being heated.

29 Claims, 4 Drawing Sheets

METHOD FOR CONTROLLING SYSTEM TO WORK AT APPROPRIATE TEMPERATURE

BACKGROUND OF THE INVENTION

1. Field of the Invention

The present invention relates to a working temperature control for an electric system such as computer system, and more particularly to a method for controlling a system to work at an appropriate temperature.

2. Description of Related Art

Figure 1:
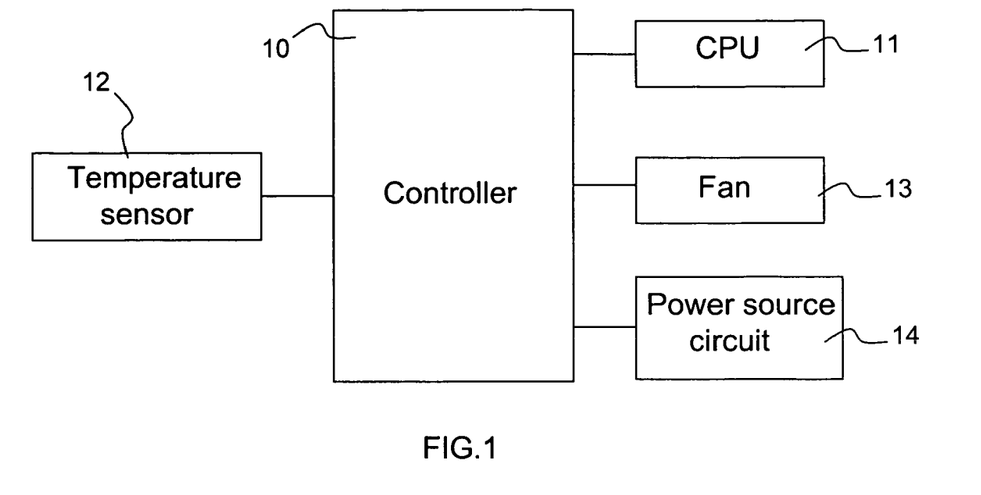
FIG. 1 is a block diagram of a conventional system temperature controlling apparatus.

Please refer to FIG. 1. Because the functions of a central processing unit (CPU) 11 become stronger, the electricity consumption thereof also becomes higher; a cooling design is also more important to a notebook computer. The current design is to set a or several temperature values; it use thermal sensors 12 to detect the temperature of a system or a CPU 11, and then uses a controller 10 to execute several preset control modes when the temperature is higher than certain temperature values. The control mode comprises a cooling control such as the rotating speed control of a fan 13, a system consumption decreasing such as the efficiency lowering of the system or the CPU 11, and the power source shutting off such as the power source turning off of the system by controlling a power source circuit 14 when the temperature rises continuously to reach an extremely high temperature so as to attain to the protection function.

There are many patents concerning controlling a computer system to work at an appropriate temperature. For example, U.S. Pat. No. 6,965,175 discloses a dynamic temperature control method for a computer system; it utilizes a microcontroller to obtain the energy consumption value and the temperature of the computer system to control a fan module to rotate in a proper range. Taiwan Invention Patent No. I246, 392 discloses a temperature measurement method and an apparatus thereof; it is used for measuring temperature inside a case of a personal computer and the surrounding thereof so as to decide the rotating speed of a fan to process cooling. Taiwan Patent Publication No. 572,257 discloses a notebook computer with temperature adjustment functions; it allows a system to emit a command to a output/input controller to lower automatically the out-of-band frequency and the working voltage of the microprocessor to force the consumed power of the microprocessor to be decreased to attain to the temperature lowering function when a temperature sensor detects that a temperature value reaches a temperature value preset by the microprocessor. Taiwan Patent application No. 502,148 discloses a system and method for immediately controlling temperature of a central processing unit of a notebook computer; it comprises executing a preset module and a warning temperature value is set through the preset module; executing a detection module, the temperature of the central processing unit at that time is immediately detected through the detection module to obtain a temperature value of the central processing unit at that time; and executing a temperature adjustment module, a judgment is processed through the temperature value at that time obtained in the detection module to dispatch a fan driving module to calculate a rotating speed that the fan should reach and then to start the fan.

Almost every controller in the current computer system cooling protection design decides a corresponding counterplot only depending on temperature detected through a temperature sensor. But, the influence of heat on the system is not merely a temperature value, heated time length is also an important factor. For example, the capacity and the life of a battery used in a notebook computer are decreased if it is used at a high temperature over a long period of time. Further, for example, although some plastic materials are not influenced at a high temperature in a short time, the characteristics thereof are also influenced if they ate at a high temperature over a long period of time.

SUMMARY OF THE INVENTION

For allowing a system to work at a more appropriate temperature, the present invention is proposed.

The main object of the present invention is to provide a method for controlling a system to work at an appropriate temperature, allowing the system to obtain a better protection while being heated and capable of extending the use life thereof.

Another object of the present invention is to provide a method for controlling a system to work at an appropriate temperature, allowing the system to work more stably and rather not to stop working abruptly to cause damage owing to too high temperature.

For attaining to the objects mentioned above, a method for controlling a system to work at an appropriate temperature according to the present invention comprises the following steps:

Allowing a controller to detect a system through at least one temperature sensor to obtain at least one temperature value T continuously;

Allowing the controller to calculate a heated value TS of the system, the heated value TS is a value in relation to heated temperature and heated time of the system;

Allowing the controller to compare the heated value TS of the system with at least one preset value PL, if TS is greater than or equal to PL, then to execute a control mode corresponding to the preset value PL to output a control signal CSI.

The method according to the present invention can further comprise the following steps:

Allowing the controller to compare the temperature value T with at least one preset temperature setting value Tn, if T is greater than or equal to Tn, then allowing the controller to compare the temperature value T with Tn continuously; if T is smaller than Tn, then allowing the controller to output another control signal CS2; The control signal CS2 allows the control mode to be operated reversely. The heated value TS can be generated as the following: allowing the controller to compare the temperature value T with at least one preset temperature setting value Tn, if T is greater than or equal to Tn, taking the time that T is greater than or equal to Tn to be a starting point, calculating the heated time length of the system to be TS value.

The heated value TS can also be generated as the following: allowing the controller to compare the temperature value T with at least one preset temperature setting value Tn, if T is greater than or equal to Tn, taking the time that T is greater than or equal to Tn to be a starting point, calculating an integration value of the heated temperature value and the heated time of the system to be the TS value. The heated value TS can also be generated as the following: allowing the controller to compare the temperature value T with at least one preset temperature setting value Tn, if T is greater than or equal to Tn, taking the time that T is greater than or equal to Tn to be a starting point, taking a certain unit time interval as a standard, calculating the number of passed time intervals to be the TS value.

The heated value TS can also be generated as the following: allowing the controller to compare the temperature value T with at least one preset temperature setting value Tn, if T is greater than or equal to Tn, taking the time that T is greater than or equal to Tn to be a starting point, calculating a summation value taking a temperature value measured in a unit time interval as a basis to be the TS value.

The heated value TS can also be generated as the following:

Allowing the controller to calculate a value of TS(T,Δt) according to the following formula to obtain the heated value TS through a time sequence provided by a time counting module:

$$TS(T, \Delta t) = \sum_i (ai + bi * Ti(ts + i * \Delta t)) * [(Ti(ts + i * \Delta t))/Tn],$$

Wherein ai and bi respectively are any real number, i is 0 and positive integers in sequence; Ti(ts+i*Δt) is a temperature value measured when the time is (ts+i*Δt); Δt is a time interval for reading a temperature value; ts is a time reference point; ai is a weighted value added to a temperature Ti(i,Δt); bi is a weighted value multiplied to the temperature Ti(i,Δt); Tn is at least one preset temperature setting value; ( )is a Gauss function.

The heated value TS can also be generated as the following: allowing the controller to compare the temperature value T with at least one preset temperature setting value Tn, if T is greater than or equal to Tn, then allowing the controller to calculate a value of TS(T,Δt) according to the following formula to obtain the heated value TS through a time sequence provided by a time counting module:

$$TS(T, \Delta t) = \sum_i ai + bi * Ti(ts + i * \Delta t),$$

T is greater than or equal to Tn, ai and bi respectively are any real number, i is 0 and positive integers in sequence;

Then calculating TS value when the temperature T is greater than or equal to Tn, and Tn is a temperature value of at least one limiting condition; Ti(ts+i*Δt) is a temperature value measured when the time is (ts+i*Δt); Δt is a time interval for reading a temperature value; ts is a time reference point; ai is a weighted value added to a temperature Ti(i,Δt); bi is a weighted value multiplied to the temperature Ti(i,Δt); ai and/or bi can respectively be equal to 0 or 1.

The control mode is a control mode that at least one of allowing a fan to change a rotating speed, allowing a central processing unit to lower the efficiency and allowing a power source circuit to shut off a power source of the system is chosen to process the control. The control signal is a control signal output from at least one of the central processing unit, the fan and the power source circuit. Whereby, the fan is caused to change a rotating speed, the central processing unit is caused to lower the efficiency or the power source circuit is caused to shut off the power source of the system.

The system is a computer system, and the computer system can be a notebook computer system or a desktop computer system.

The time counting module can be built in the controller.

The time counting module can also be an independent time counter positioned outside the controller.

The time counting module can also be a time counter, the time counter is combined with the temperature sensor.

The TS value can be allowed to obtain when ai is equal 1 and bi is equal 0; it is a value of the number that T is greater than or equal to Tn in a time interval Δt; the preset value PL is a preset value corresponding to this calculation mode.

The preset value PL can be one of two preset values of two calculation modes respectively corresponding to that bi is not equal to 0 and that ai is equal to 1 and bi is equal to 0 in the formula mentioned above.

The obtained heated value TS can be one of two heated value respectively obtained from two calculation modes corresponding to that bi is not equal to 0 and that ai is equal to 1 and bi is equal to 0 in the formula mentioned above.

Comparing the TS with the PL, if TS is smaller than PL, the controller is allowed to continue comparing the TS with the PL.

Comparing the T with the Tn, if T is smaller than Tn, the controller is allowed to continue comparing the T with the Tn.

The control signal CS2 is a control signal output to at least one of the central processing unit, the fan and the power source circuit. Whereby, the fan is caused to decrease a rotating speed, the central processing unit is caused to elevate the efficiency or the power source circuit is caused to turn on the power source of the system.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

The present invention is used for combining heated temperature and time of a system to allow a cooling protection design to be more complete.

Figure 2:
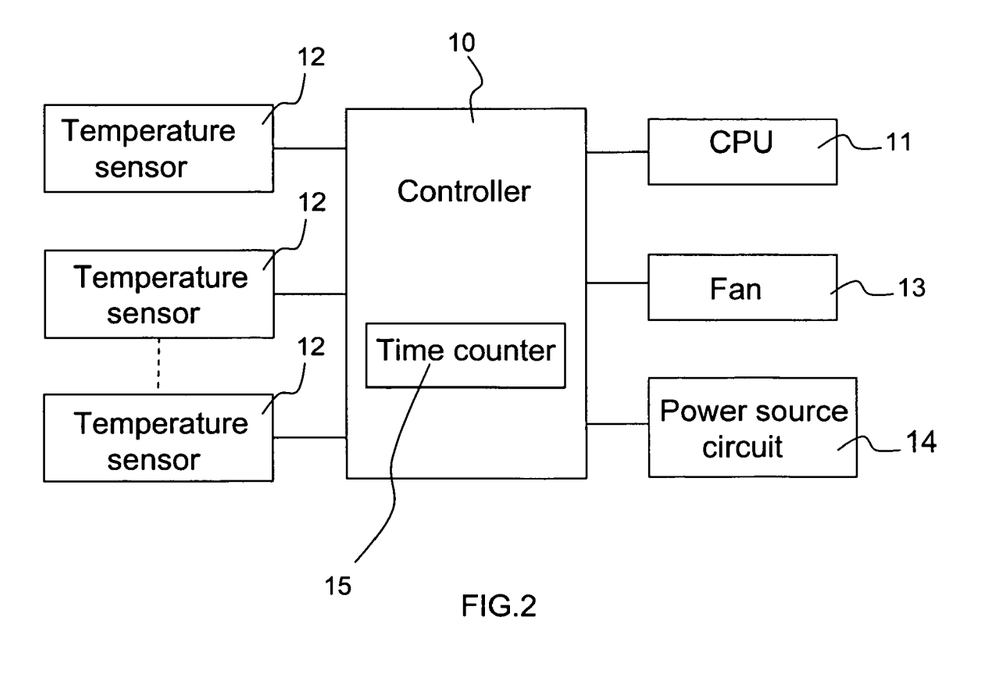
FIG. 2 is a block diagram, showing an apparatus for carrying out a method of a first preferred embodiment according to the present invention.
Figure 3:
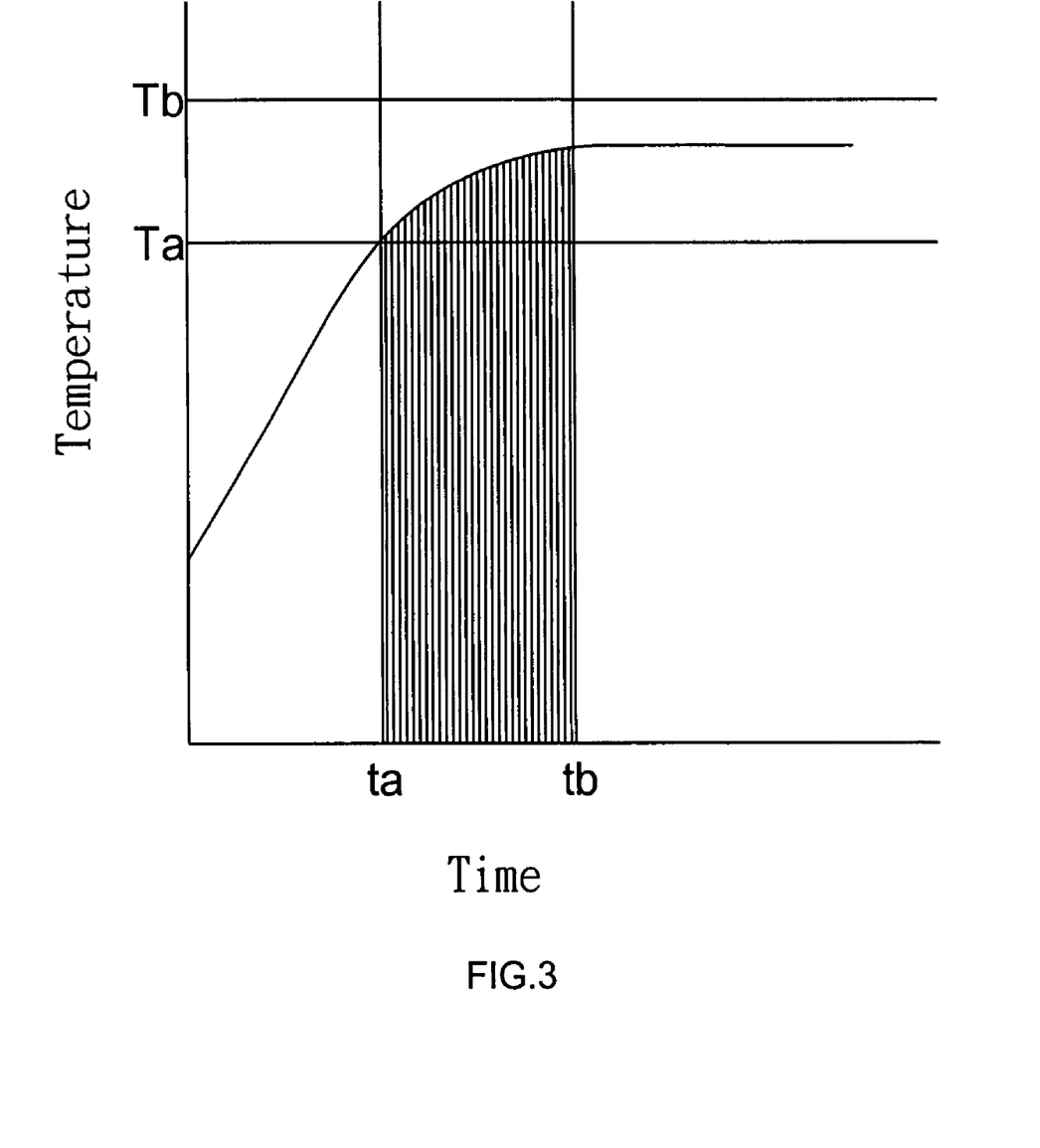
FIG. 3 is a graph, showing a relationship between temperature and time when a system is heated.

Please refer to FIGS. 2 and 3. An apparatus for carrying out a method of a first preferred embodiment according to the present invention comprises a controller 10 respectively electrically connected with temperature sensors 12 a central processing unit 11, a fan 13, and a power source circuit 14, in which the controller 10 is provided with a inbuilt time counting module 15. The time counting module 15 can be a time counter or a time counting program.

According to the current computer system cooling protection design, when the controller 10 detects that a heated temperature of a system is over Ta but not reaches a temperature Tb at which a control mode must be executed and close to the temperature Tb continuously in a long time respectively through the temperature sensors 12 as FIG. 3 shows, the controller 10 will not execute the control mode and not emit a control signal to the central processing unit 11, the fan 13 or the power source circuit 14 to process any cooling protection countermeasure. But, components of the system are located in an environment close to the higher temperature Tb in a long time, they will possibly be damaged.

According to the present invention, when a system is heated, not only a temperature factor but also a heated time factor is considered. When a heated value of the system reaches different preset condition values, the system is then allowed to process every kind of different cooling protection control mode depending on different heated states, for example, when the heated value of the system reaches a first condition value, the controller 10 then emits a control signal to the fan 13 to allow the fan 13 to change a rotating speed; when the heated value reaches a second condition value, the controller 10 then emits a control signal to the central processing unit 11 to allow the central processing unit 11 to lower the efficiency; or when the heated value reaches a third condition value, the controller 10 then emits a control signal to the power source circuit 14 to allow the power source circuit 14 to shut off the power source of the system so as to process every king of different protection.

All kinds of cooling protection control modes for a heated system according to the present invention are shown as the followings:

(1) when a temperature measured by the temperature sensor 21 is over and above T1, and a heated value Ts reaches a preset value PL1, then executing a control mode A corresponding to the preset value PL1, for example, allowing the fan 13 to increase a rotating speed to elevate the cooling efficiency so as to cause the system to lower the temperature.

(2) when a temperature measured by the temperature sensor 21 is over and above T2, and a heated value Ts reaches a preset value PL2, then executing a control mode B corresponding to the preset value PL2, for example, allowing the fan 13 to further increase a rotating speed to elevate the cooling efficiency so as to cause the system to lower the temperature.

(3) when a temperature measured by the temperature sensor 12 is over and above T3, and a heated value Ts reaches a preset value PL3, then executing a control mode C corresponding to the preset value PL3, for example, allowing the central processing unit 11 to lower the efficiency to allow the central processing unit to reduce heat accumulation so as to cause the temperature in the system to be lowered.

(4) when a temperature measured by the temperature sensor 12 is over and above T4, and a heated value Ts reaches a preset value PL4, then executing a control mode D corresponding to the preset value PL4, for example, controlling the power source circuit 14 to shut off the power source of the system so as to prevent the system from overheating to cause damage.

(5) when a temperature measured by the temperature sensor 12 is over and above T5, and a heated value Ts reaches a preset value PL5, then executing a control mode E corresponding to the preset value PL5, for example, allowing the fan 13 to increase a rotating speed to elevate the cooling efficiency so as to cause the system to lower the temperature.

(6) when a temperature measured by the temperature sensor 12 is over and above T6, and a heated value Ts reaches a preset value PL6, then executing a control mode F corresponding to the preset value PL6, for example, allowing the central processing unit 11 to lower the efficiency to allow the central processing unit to reduce heat accumulation so as to cause the temperature in the system to be lowered.

(7) when a temperature measured by the temperature sensor 12 is over and above T7, and a heated value Ts reaches a preset value PL7, then executing a control mode G corresponding to the preset value PL7, for example, controlling the power source circuit 14 to shut off the power source of the system so as to prevent the system from overheating to cause damage.

(8) when a temperature measured by the temperature sensor 12 is over and above T8, and a heated value Ts reaches a preset value PL8, then executing a control mode H corresponding to the preset value PL8, for example, allowing the fan 13 to increase a rotating speed to elevate the cooling efficiency so as to cause the system to lower the temperature.

(9) when a temperature measured by the temperature sensor 12 is over and above T9, and a heated value Ts reaches a preset value PL9, then executing a control mode I corresponding to the preset value PL9, for example, allowing the central processing unit 11 to lower the efficiency to allow the central processing unit to reduce heat accumulation so as to cause the temperature in the system to be lowered.

(10) when a temperature measured by the temperature sensor 12 is over and above T10, and a heated value Ts reaches a preset value PL10, then executing a control mode J corresponding to the preset value PL10, for example, controlling the power source circuit 14 to shut off the power source of the system so as to prevent the system from overheating to cause damage. The heated value TS of the system is in relation to the heated temperature and the heated time of the system such as the one shown in FIG. 3. Only if the heated temperature of the system T is greater than or equal to Ta, the TS value is generated; the TS value is respectively generated by the following ways:

1. taking time t when T is greater than or equal to Ta as a starting point, calculating the heated time length of the system to be the TS value such as the one shown in FIG. 3, TS=tb−ta when t is tb;
2. taking an integration value in relation to temperature and time to be TS value such as the one shown in FIG. 3, $$TS = \int_{ta}^{tb} f(t) dt\, f(t) dt \text{ when } t \text{ is } tb,$$

in which the integration range is from ta to tb, and the heated value of the system T=f(t), f(t) is a temperature detected practically by the temperature sensor at different time.

3. taking a certain unit time interval as a standard, reading a value of a number indicating how many the time intervals are passed to be the TS value such as the one shown in FIG. 3. If the unit time interval is adopted to be 10 seconds, TS=[(tb−ta)/10] when time is tb, in which [ ] represents Gauss function; if (tb−ta)/10 is equal to 0.5 or 2.5, the TS is then equal to 0 or 2.
4. taking a summation value obtained on the basis of a measured temperature value in a unit time interval to be the TS value such as the one shown in FIG. 3. If the adopted unit time interval is tb−ta, then TS=ta+tb when time t is tb;

the TS value can be respectively generate from the following formulas in which temperature T and time interval Δt are variables.

5. generating the TS value by the following formula:

$$TS(T, \Delta t) = \sum_i a_i + b_i * T_i(ts + i * \Delta t),$$

T is greater than or equal to Tn, ai and bi respectively are a real number, i is o and positive integer in sequence;
in which the controller causes the temperature value T to compare with at least one preset temperature setting value Tn, only when the temperature T is greater than or equal to Tn, the TS value is calculated, and Tn can be a temperature with at least one different limit condition;

the controller reads time values (ts+i*Δt) through a time sequence provided by a time counting module; Ti(ts+i*Δt) is a temperature measured when the time is (ts+i*Δt); Δt is a time interval for reading temperature values; ai is a weighted value added to the temperature Ti(i,Δt); bi is a weighted value multiplied to the temperature Ti(i,Δt); the interval Δt can be 10 seconds, 20 seconds or others; ts is a reference point and the earliest time that the temperature T is greater than or equal to Tn; for example, T₀(ts+0*Δt) expresses the temperature value measured when time is ts, T₁(ts+1*Δt) expresses the temperature value measured when time is (ts+Δt), the rest may be inferred by analogy.

For example, when any one of the temperature sensors 12 detects that the heated temperature T of the system reaches Ta at the time ta, the controller 10 relies on the time counting of the inbuilt time counting module 15 to calculate the values of TS(T,Δt) according to the formula mentioned above to obtain the heated value TS of a system. For example, when ai is equal to 0, bi is equal to 1 and Δt=10 in the formula mentioned above, 10 seconds is taken as a time interval, The heated TS is equal to Ta plus sequentially temperature values every ten seconds interval from time ta; or, in a certain temperature range, the temperature value is allowed to process every kind of mathematic operation such as add to a certain weight value ai or multiply to a certain weighted value bi. When the time reaches tb, if the TS value of the heated formula teaches one of the different preset condition values, the controller 10 then executes the corresponding different cooling protection control mode mentioned above. Furthermore, when ai=1, bi=0 and Δt=10, 10 seconds is taken as a time interval, the temperatures T calculated every 10 seconds interval form the time ta is judged whether they are greater than or equal to Tn, and the times that T is greater than or equal to Tn is summed to be taken as the value TS.

6. generating the TS value by the following formula:

$$TS(T, \Delta t) = \sum_i (ai + bi * Ti(ts + i*\Delta t)) * ((Ti(ts + i*\Delta t))/Tn)$$

in which ( ) is a Gauss function; ai, bi is any real number, i is 0 and positive integers in sequence; Tn is at least one temperature setting value; the description relating to ai, bi, ts and Δt is the same as the description in the item 5 mentioned above. The formula is used for calculating the TS value and the TS value is directly calculated without needing to judge whether T is greater than or equal to Tn or not. This is because the working temperature of a normal system is a position value, and normally, even the value of (Ti(ts+i*Δt))/Tn still not reaches 2, Ti(ts+i*Δt) can then be greater than Tb to lead to the overheating of the system to stop the normal operation. Therefore, when the value of (Ti(ts+i*Δt))/Tn is smaller than 1 and greater than or equal to 0, [(Ti(ts+i*Δt))/Tn]=0 so that that TS(T,Δt)=0 is obtained by using the formula mentioned above; when the value of (Ti(ts+i*Δt))/Tn is smaller than 2 and greater than or equal to 1, [(Ti(ts+i*Δt))/Tn]=1 so that TS(T,Δt) obtained by using the formula mentioned above is the same as the one obtain from the formula mentioned in the item 5, they both are:

$$TS(T, \Delta t) = \sum_i ai + bi * Ti(ts + i*\Delta t).$$

Figure 4:
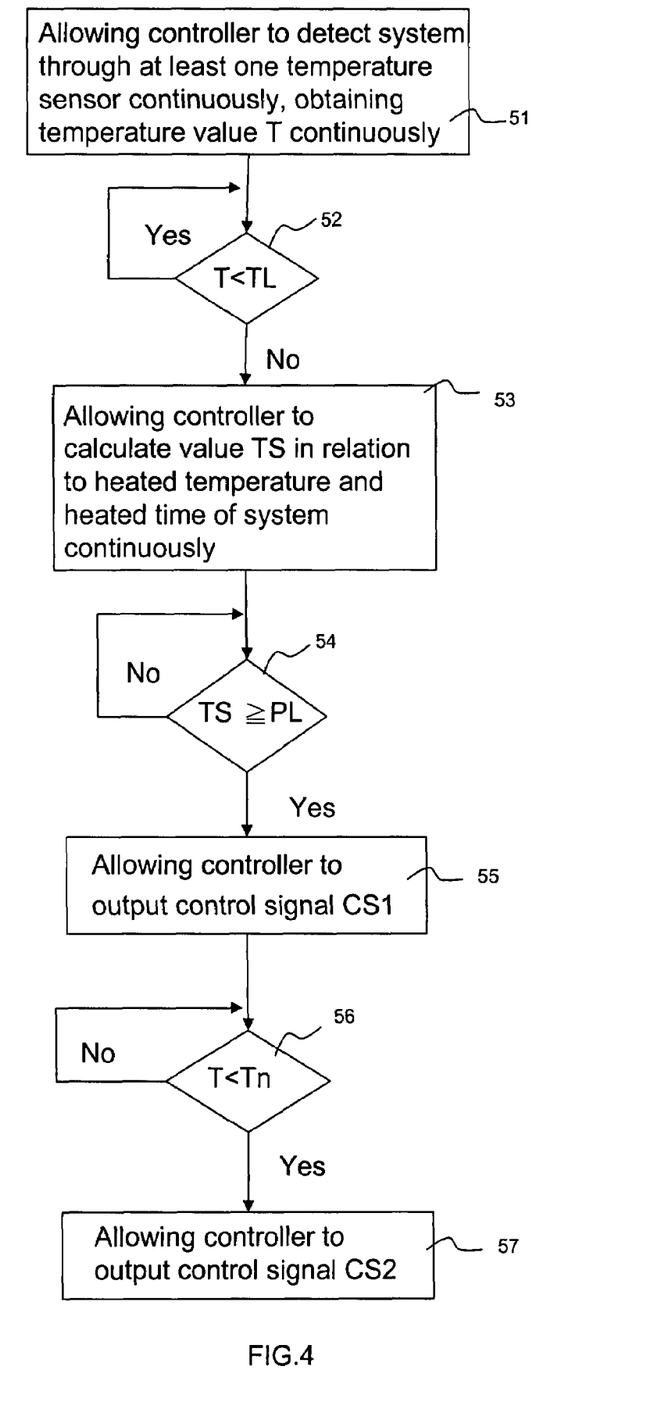
FIG. 4 is a flow chart, showing steps of a method according to the present invention.

Please refer to FIGS. 2 and 4. A method for controlling a system to work at an appropriate temperature of the present embodiment comprises the following steps:

Step 51: allowing the controller 10 to detect a-system continuously through at least one of temperature sensors 12, obtaining continuously at least one temperature value T such as the temperatures values of T1 to T10 mentioned above; the temperature T can also be an arithmetic average of a several temperature values detected by the sensors 12;

Step 52: allowing the controller 10 to compare the temperature T with at least one preset temperature setting value Tn such as the temperature values of T1 to T10 mentioned above, if T is smaller than Tn, allowing the controller 10 to compare T with Tn continuously; if T is greater than or equal to Tn, then entering Step 53;

Step 53: allowing the controller 10 to calculate the heated value Ts of the system, in which the heated value Ts is in relation to heat temperature and heated time of the system;

Step 54: allowing the controller 10 to compare the heated value TS of the system with at least one preset value PL such as the values of PL1 to PL10 mentioned above, if TS is smaller than PL, then allowing the controller 10 to compare TS with PL continuously, if TS is greater than or equal to PL, then entering Step 55;

Step 55: allowing the controller 10 to execute a control mode corresponding to the preset value PL such as the control modes A to J mentioned above, outputting a control signal CS1;

Step 56: allowing the controller 10 to compare the temperature T with at least preset temperature setting value Tn such as the temperature values of T1 to T10, if T is greater than or equal to Tn, allowing the controller 10 to compare T with Tn continuously; if T is smaller than Tn, then entering Step 57;

Step 57: allowing the controller 10 to output a control signal CS2 such as a control signal allowing the control modes A to J to be operated reversely.

The system mentioned above can be a notebook computer system or desktop computer system, and the heated value TS is generated by every kind of manner mentioned above; but, if the heated value TS is generated by the sixth manner mentioned above, The TS value is directly calculated without needing Step 52 because it need not to judge whether T is greater than or equal to Tn or not.

The control signal CS1 in Step 55 is a control signal output to the central processing unit 11, the fan 13 or the power source circuit 14 to cause the fan 13 to change a rotating speed, the central processing unit 11 to lower the efficiency or the power source circuit 14 to shut off a system power source so as to process every kind of protection.

The control signal CS2 in Step 57 is a control signal output to the central processing unit 11, the fan 13 or the power source circuit 14 to cause the fan 13 to decrease the rotating speed, the central processing unit 11 to increase the efficiency or the power source circuit 14 to start the system power source.

Figure 5:
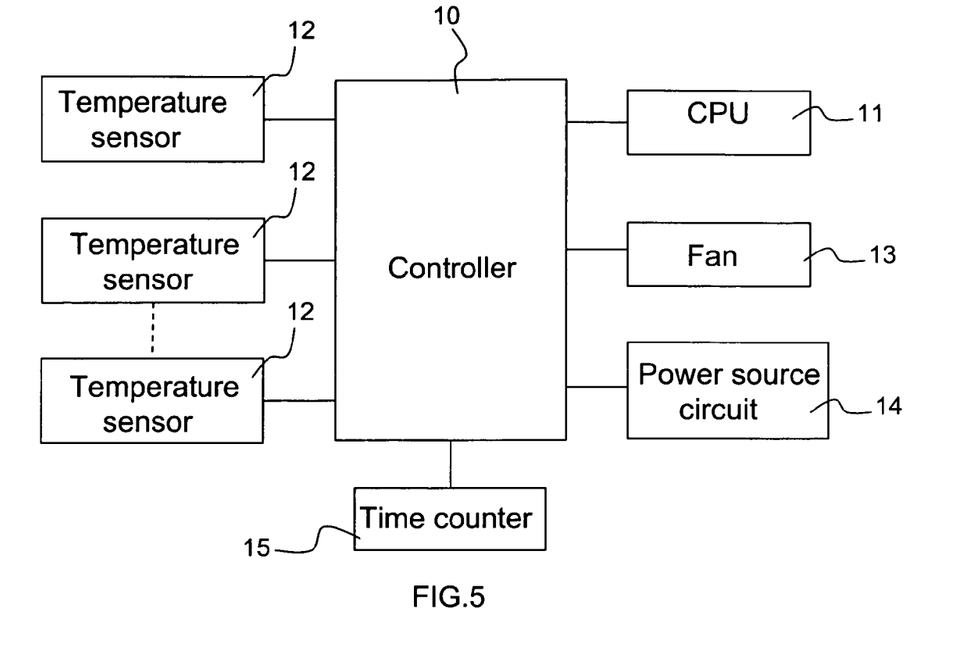
FIG. 5 is a block diagram, showing an apparatus for carrying out a method of a second preferred embodiment according to the present invention.

Please refer to FIG. 5. An apparatus for carrying out a method of a second preferred embodiment according to the present invention comprises a controller 10 respectively connected with at least one of temperature sensors 12, a central processing unit 11, a fan 13, an power source circuit 14 and a time counter 15, in which the time counter 15 is independently disposed out of the controller 10.

Figure 6:
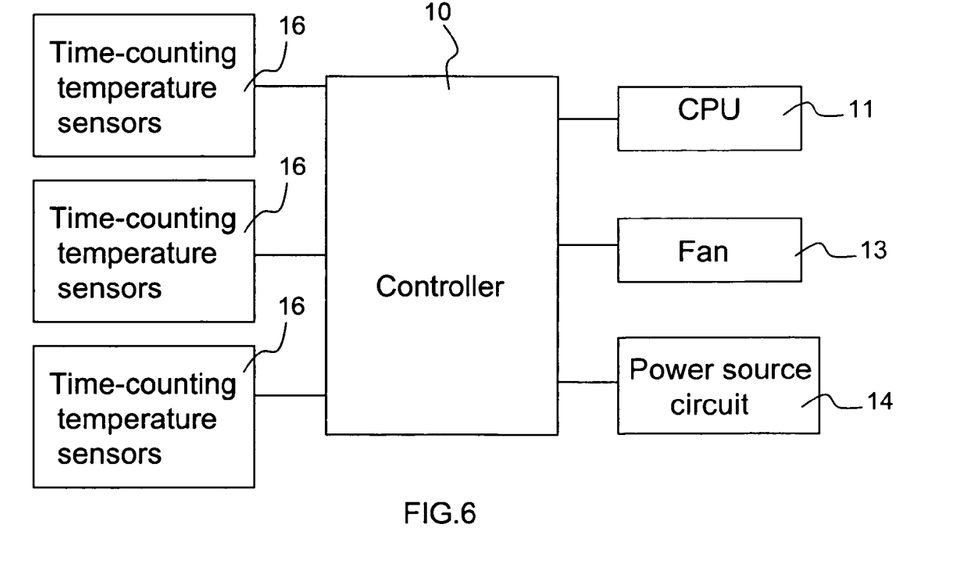
FIG. 6 is a block diagram, showing an apparatus for carrying out a method of a third preferred embodiment according to the present invention.

Please refer FIG. 6. An apparatus for carrying out a method of a third preferred embodiment according to the present invention comprises a controller 10 respectively connected with at least one of time-counting temperature sensors 16, a central processing unit 11, a fan 13 and an power source circuit 14, in which each of the time-counting temperature sensor 16 is a temperature sensor combined with a time counter.

The present invention proposes a control manner not only a temperature factor but also a time factor to be considered when a system is heated, a heated value of the system must reach a certain preset value, a controller will then execute a control mode to emit a control signal.

Therefore, it can also prevent the controller from processing a response immediately to a sudden elevated high temperature signal caused from a wrong signal. A consideration factor of a heated time length is added to allow each component of the system to obtain a better protection while being heated, not only the use life of each component can be extended, but also the system is allowed to be more stable when it is working and not to stop working suddenly to cause damage owing to a over high temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for controlling a system to work at an appropriate temperature, comprising the following steps:
   employing a controller to detect a parameter of said system continuously through at least one temperature sensor, and obtaining at least one temperature value T continuously;
   calculating, using said controller, a heated value TS of said system in relation to a heated temperature and a heated time of said system;
   comparing, using said controller, said heated value TS of said system with at least one preset value PL, if TS is greater than or equal to PL, said controller executing a control mode corresponding to said preset value PL and outputting a control signal CSI; and
   said control signal CSI causing singularly or in combination an action selected from the group consisting of:
   changing a rotating speed of a fan,
   lowering the efficiency of a Central Processing Unit (CPU), and
   shutting off a power source of said system using a power source circuit,
   wherein said heated value TS is generated by the following step: said controller calculating a value of TS(T, $\Delta t$) according to the following formula to obtain said heated value TS by means of a time sequence provided by a time counting module:

$$TS(T, \Delta t) = \sum_i (ai + bi * Ti(ts + i * \Delta t)) * [(Ti(ts + i * \Delta t))/Tn],$$

in which ai and bi are real numbers, i is 0 or a positive integer in sequence; Ti(ts+i*$\Delta t$) is said temperature value measured when time is (ts+i*$\Delta t$); $\Delta t$ is a time interval for reading said temperature value; ts is a time reference point: ai is a weighted value added to a temperature Ti(i, $\Delta t$); bi is a weight value multiplied to Ti(i, $\Delta t$); Tn is at least one preset temperature setting value; [ ] is a Gauss function.

2. The method according to claim 1, further comprising the following steps: said controller comparing said temperature T with at least one preset temperature setting value Tn, if T is greater than or equal to Tn, said controller comparing said temperature T with Tn continuously; if T is less than Tn, then causing said controller to output another control signal CS2; said control signal CS2 causing said control mode to be operated reversely.

3. The method according claim 1, wherein said time counting module is built in said controller.

4. The method according to claim 1, wherein said time counting module is a time counter disposed independently outside of said controller.

5. The method according to claim 1, wherein said time counting module is a time counter, said time counter is combined with said temperature sensor.

6. The method according to claim 1, wherein said ai is equal to 0.

7. The method according to claim 6, wherein said bi is equal to 1.

8. The method according to claim 1, wherein said bi is equal to 1.

9. The method according to claim 1, wherein said ai is equal to 1 and bi is equal to 0.

10. The method according to claim 1, wherein said preset value PL comprises two preset values respectively corresponding to two calculation modes of bi not equal to 0, and ai equal to 1 and bi equal to 0 in said formula.

11. The method according to claim 10, wherein said obtained heated value TS comprises two heated value respectively obtained from two calculation modes of said bi not equal to 0, and ai equal to 1 and bi equal to 0 in said formula.

12. The method according to claim 1, wherein said TS is compared with said PL, if TS is less than PL, said controller compares said TS with PL continuously.

13. The method according to claim 1, wherein said T is compared with said Tn, if T is less than Tn, said controller compares said T with Tn continuously.

14. The method according to claim 1, further comprising the following steps: said controller comparing said temperature value T with at least one preset temperature setting value Tn, if T is greater than or equal to Tn, said controller comparing said temperature value T with Tn continuously, if T is less than Tn, then entering the next step: causing said controller to output another control signal CS2; said control signal CS2 causing said control mode to be operated reversely.

15. The method according to claim 14, wherein said control signal CS2 is a control signal output from at least one chosen from said central processing unit, said fan and said power source circuit; whereby, said fan decreases a rotating speed, said central processing unit elevates the efficiency, or said power source circuit starts the power source of said system.

16. A method for controlling a system to work at an appropriate temperature, comprising the following steps:
   employing a controller to detect a parameter of said system continuously through at least one temperature sensor, and obtaining at least one temperature value T continuously;
   calculating, using said controller, a heated value TS of said system in relation to a heated temperature and a heated time of said system;

comparing, using said controller, said heated value TS of said system with at least one preset value PL, if TS is greater than or equal to PL, said controller executing a control mode corresponding to said preset value PL and outputting a control signal CSI; and said control signal CSI causing singularly or in combination an action selected from the group consisting of:

changing a rotating speed of a fan, lowering the efficiency of a Central Processing Unit (CPU), and shutting off a power source of said system using a power source circuit, wherein said heated value TS is generated by the following step: said controller compares said temperature T with at least one preset temperature setting value Tn, if T is greater than or equal to Tn, then said controller calculating a value of TS(T, Δt) according to the following formula to obtain said heated value TS by means of a time sequence provided by a time counting module:

$$TS(T, \Delta t) = \sum_i ai + bi * Ti(ts + i * \Delta t),$$

, T is greater than or equal to Tn; ai and bi are real numbers, i is 0 or a positive integer in sequence; in which only when the temperature T is greater than or equal to Tn, said TS value is calculated, and said Tn is said temperature value with at least one limit condition; Ti(ts+i*Δt) is said temperature value measured when time is (ts+i*Δt); Δt is a time interval for reading a temperature value; ts is a time reference point; ai is a weighted value added to a temperature Ti(i, Δt); bi is a weight value multiplied to Ti(i, Δt).

17. The method according claim 16, wherein said time counting module is built in said controller.

18. The method according to claim 16, wherein said time counting module is a time counter disposed independently outside of said controller.

19. The method according to claim 16, wherein said time counting module is a time counter, said time counter is combined with said temperature sensor.

20. The method according to claim 16, wherein said ai is equal to 0.

21. The method according to claim 20, wherein said bi is equal to 1.

22. The method according to claim 20, wherein said bi equal to 1.

23. The method according to claim 16, wherein said ai is equal to 1 and bi is equal to 0.

24. The method according to claim 16, wherein said preset value PL comprises two preset values respectively corresponding to two calculation modes of bi not equal to 0, and ai equal to 1 and bi equal to 0 in said formula.

25. The method according to claim 24, wherein said obtained heated value TS comprises two heated value respectively obtained from two calculation modes of said bi not equal to 0, and ai equal to 1 and bi equal to 0 in said formula.

26. The method according to claim 16, wherein said TS is compared with said PL, if TS is less than PL, then said controller compares said TS with PL continuously.

27. The method according to claim 16, wherein said T is compared with said Tn, if T is less than Tn, then said controller compares said T with Tn continuously.

28. The method according to claim 16, further comprising the following steps: said controller comparing said temperature value T with said temperature setting value Tn, if T is greater than or equal to Tn, said controller comparing said temperature value T with Tn continuously, if T is less than Tn, then entering the next step; causing said controller to output another control signal CS2; said control signal CS2 causing said control mode to be operated reversely.

29. The method according to claim 28, wherein said control signal CS2 is a control signal output from at least one chosen from said central processing unit, said fan and said power source circuit; whereby, said fan decreases a rotating speed, said central processing unit elevates the efficiency, or said power source circuit starts the power source of said system.

* * * * *